Nov. 7, 1933.  G. ROTTMAN  1,934,449
SAFETY DEVICE FOR VEHICLES
Filed Oct. 27, 1931  3 Sheets-Sheet 1
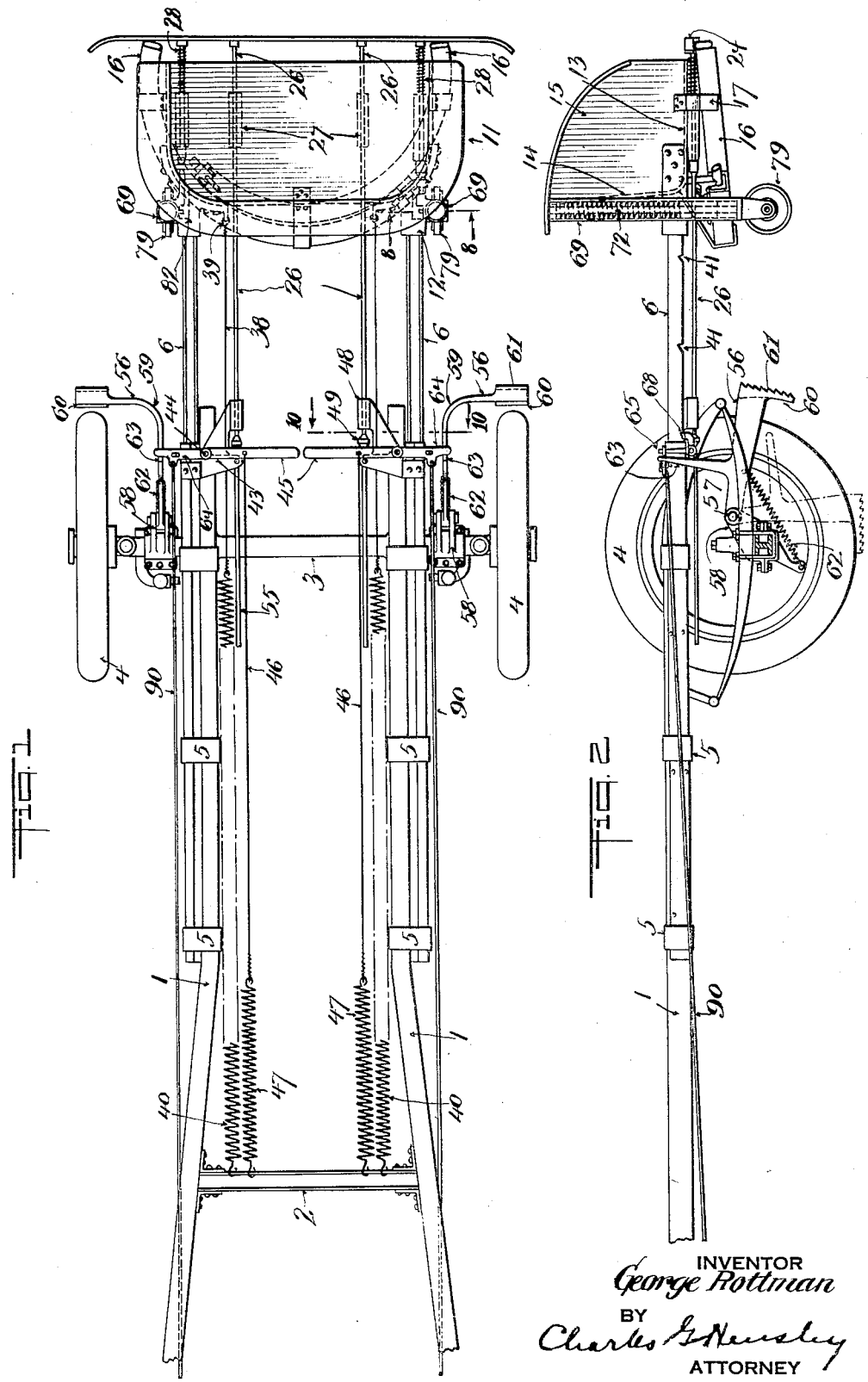
INVENTOR
George Rottman
BY
Charles G. Hensley
ATTORNEY

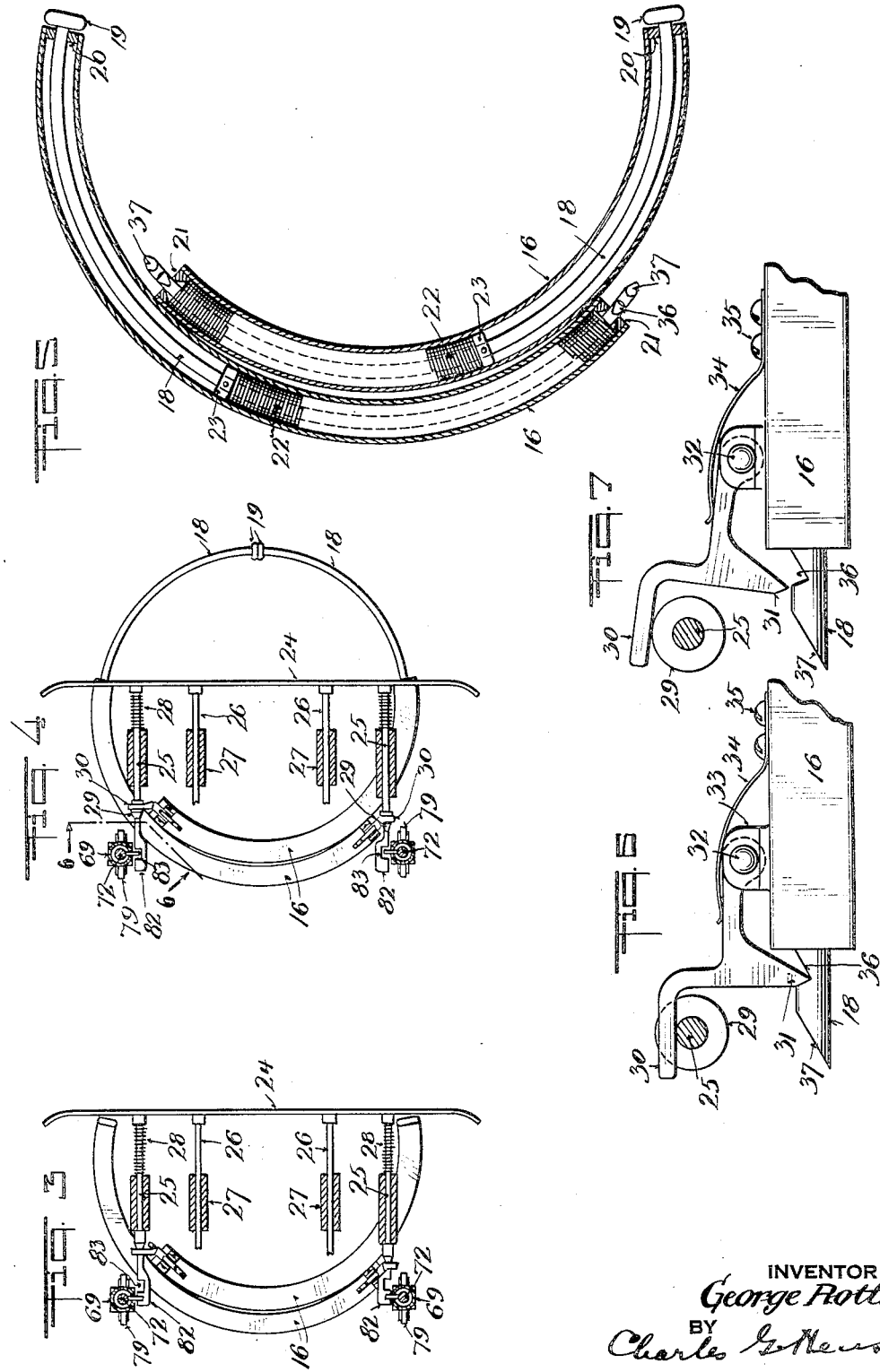

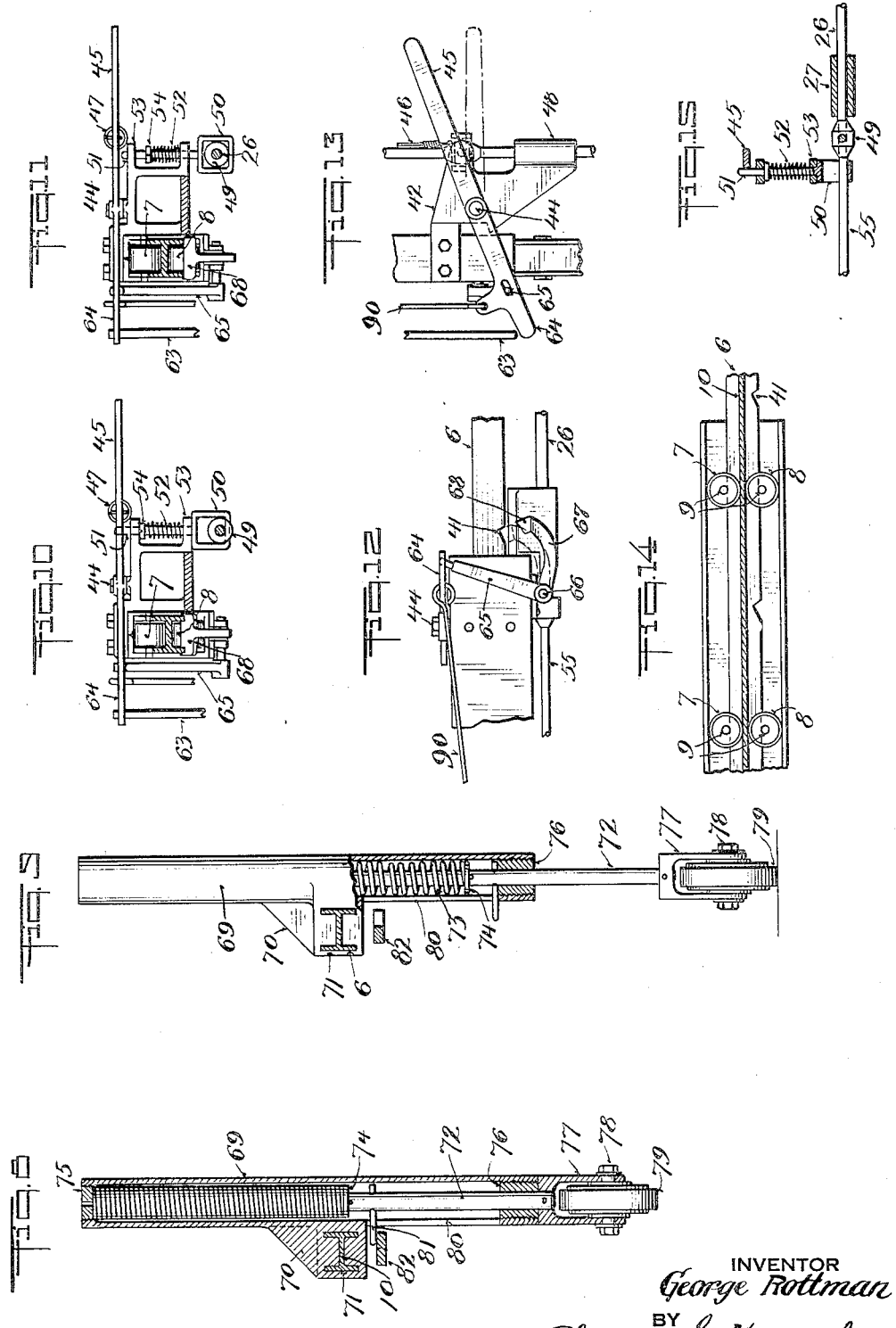

Patented Nov. 7, 1933

1,934,449

UNITED STATES PATENT OFFICE 1,934,449

SAFETY DEVICE FOR VEHICLES

George Rottman, New York, N. Y.

Application October 27, 1931. Serial No. 571,335

26 Claims. (Cl. 293—16)

This invention relates to improvements in safety devices for vehicles, especially for automobiles, and it is intended to prevent and to limit injury to pedestrians in case the vehicle comes into contact therewith.

In its broad aspect the invention includes a safety device which will be certain and rapid in its operation if it comes in contact with a pedestrian and which will both support and grasp the body as soon as the latter comes into contact with the safety device and thereby prevent the body from falling under the wheels of the vehicle and being otherwise subject to injury. One of the features of advantage of the present device is that the device for supporting and grasping the body may be positioned some distance ahead of the chassis of the vehicle, the exact location being subject to adjustment. In addition, automatic devices are set into operation on the forward portion of the safety device which contacts with the body and these automatic devices effect the rapid rearward motion of the body supporting and grasping devices toward the chassis of the vehicle in order to cushion the shock caused by the contact of the body with the safety device. Ordinarily, where the vehicle is in motion at the time it strokes a body, the movement of the vehicle and the inertia of the body would cause a considerable shock to the body.

In the present apparatus the devices for supporting and grasping the body are retracted rapidly at the instant the body comes in contact with the forward portion of the apparatus, so that instead of a hard or sudden blow against the body, the action is cushioned or modified by the retraction of the supporting device in order to eliminate the danger of injuring the body while it is being received on the safety device. Without the action referred to the body is likely to be injured as much by the safety device as by being struck by a vehicle which is not provided with a safety device.

By making the body supporting and grasping devices adjustable they may be disposed at any desired distance ahead of the chassis of the vehicle and the position may correspond more or less with the average speed at which the vehicle is driven, so that if high speed is the custom of the driver he may set the body supporting device at the extreme forward position, whereas in the case of trucks or other vehicles which move at lower speed, the position may be correspondingly adjusted to suit the conditions. The greater the speed of the vehicle the more desirable it is to advance the body supporting device, in order that the retracting motion will be greater and thereby cushion the shock as the body comes into contact with the safety device.

I have shown a safety device mounted on side rails firmly secured to the chassis of the vehicle and projecting forwardly to support the body supporting means in advance of the usual portions of the vehicle; and there is a bumper associated with the body supporting means, against which the body initially engages and this bumper is adapted to control the operation of several devices of the following nature.

There are circularly disposed arms which are released when the bumper is struck and these arms move in the arcs of circles so that they surround the body which strikes on the seat portion of the support, in order to prevent the body from being thrown forwardly and off the support when once resting on the body support. There is also a brake operating device which is set into operation by the bumper device combined with a type of brake which projects shoes under the wheels of the vehicle to engage the road surface and to bring the vehicle to a very quick stop.

Associated with the body supporting device, which is itself retractible along the rails referred to above, are plungers which are forced downwardly when released by the bumper movement, and these plungers have rollers on their lower ends which are normally above and out of contact with the road but which come into contact therewith when the plungers move downwardly, for the purpose of forming auxiliary supports for the body supporting device as the same is retracted, in order to more perfectly support the weight of the body, as well as the body supporting device. These plunger devices carrying the auxiliary wheels are released by the action of the bumper when the bumper strikes a body, and the downward projection is effected automatically as soon as the releasing device is actuated.

My invention includes, in addition to the broad features referred to above, specific improvements in the various individual devices of the complete combination for the purpose of carrying out the objects of the invention effectively, and which reduce the mechanism as a whole to a simple embodiment.

The bumper device also serves to initiate the setting of the brakes if the bumper comes into contact with a vehicle preceding the one on which the device is used, so that the brake device is set in this instance as well as when the body strikes a pedestrian. In this sense the device also protects the vehicle on which it is used.

Other features will be set forth in the following detailed description of my invention.

In the drawings forming part of this application,

Figure 1 is a plan view of a portion of the chassis of an automobile to which my invention has been applied, Figure 2 is a sectional view thereof showing most of the devices illustrated in Figure 1 in side elevation, Figure 3 is a sectional view illustrating the bumper device and the initiating devices actuated thereby, Figure 4 is a similar view illustrating the parts in the position when the bumper is forced back by contact with the body and the body gripping members are projected, Figure 5 is an enlarged, sectional view showing in detail the body grasping devices, Figure 6 is a sectional view taken on the line 6—6 of Figure 4, Figure 7 is a similar view but showing the parts in the position at the time the releasing pawl is disengaged, Figure 8 is a sectional view on the line 8—8 of Figure 1, Figure 9 is a detailed sectional view on an enlarged scale, showing one of the plungers and auxiliary supporting wheel, Figure 10 is a sectional view taken on the line 10—10 of Figure 1, Figure 11 is a similar view illustrating the parts in a different position, Figure 12 is a detailed elevation showing the parts which release the body supporting device to permit it to be retracted, Figure 13 is a plan view on an enlarged scale of the releasing mechanism, Figure 14 is a sectional view through the central portion of one of the fixed supporting rails, showing how the body supporting carriage travels thereon, and Figure 15 is a detailed sectional view showing one of the releasing devices.

I have shown only such parts of the chassis of a complete vehicle as are necessary to illustrate the application and operation of my invention. In the drawings I have shown the angle metal beams 1 extending lengthwise of the chassis and constituting the main members of the chassis frame. These are connected with each other at the forward end of the vehicle by means of the cross beam 2 to which part of the present apparatus is connected. I have shown the front axle 3 of the vehicle and the front wheels 4 which are pivotally mounted in the usual manner on the fixed member of the axle. As far as the chassis frame, axle and wheels are concerned they may all follow present automobile practice as my invention requires no modification of the vehicle structure other than the application of the parts hereinafter described to the chassis frame.

There are brackets 5 rigidly connected to the chassis beams 1, three being shown at each side of the vehicle, which brackets extend laterally from the chassis beams and form rigid supports for the two H beams 6.

These brackets are provided with upper and lower rollers 7, 8 mounted on studs 9 passing through the side walls of the brackets 5 the several rollers of the several brackets being disposed in alignment, so that the upper rollers engage the top surface of the cross web 10 of the H beams and the lower rollers engage the under surface of the same wall of the H beams. The construction is alike at both sides of the vehicle, so that the pair of H beams 6 are adapted to move lengthwise of the vehicle, being supported and guided by the several rollers 7, 8 between which the H beam moves with a rolling contact.

These H beams 6 are so proportioned that when in active position as shown in Figures 1 and 2, they project forwardly of the chassis structure and, in fact, extend forwardly of any portion of the vehicle a sufficient distance to allow the body supporting device to be retracted in relation to the forward end of the vehicle.

The body supporting device includes a frame structure 11 provided with an H shaped opening in the brackets 12 which form a part of the frame so that each H beam extends through the H shaped opening at opposite sides of the structure, whereby the body supporting frame is attached to and movable with the H beams, the frame being disposed on the forward ends of the H beams with the body supporting portion of the frame extending partly ahead of the H beams. The frame 11 is provided with walls 13, 14 forming a seat and back rest onto which a body may fall or be received if the safety device comes in contact therewith, the purpose being to provide a body support at such an elevation that when the device comes in contact with the body of a pedestrian the latter will fall on the seat portion 13 and lie within the confines of the side guards 15 of the seat and be supported above and free from the ground until the vehicle has been brought to a stop.

There are arcuate frames or housings 16 rigidly mounted in the body supporting frame by means of brackets 17 and shown disposed just below the seat 13 and somewhat inclined in relation thereto. In each of these housings there is an arcuate rod 18 conforming with the curvature of the housings and provided with an abutment member or enlargement 19 which, when the device is in folded or operative position, lies adjacent one end of each housing and near the guiding plug 20 which is inserted and secured in the outer end of each of the housings. These arcuate rods, therefore, have a bearing adjacent one end in the plugs 20 and when the device is in folded position each rod has a bearing also in an apertured plug 21 fixed in the inner or opposite end of each housing. It will be apparent in Figure 5 that the two housings and their respective arcuate rods lie in concentric relation with each other as viewed from the top, so that the rods may move in the manner hereinafter described.

In each housing there is a coiled spring 22 surrounding the respective arcuate rod in the housing, the spring being compressed between the plug 21 and a collar 23 fixed on the rod, for the purpose of forcing the rod in one direction necessary to project it from its housing and so that the projected portions of both rods will come together at the front of the seat member and surround the body resting on the seat. The rods are released for operation by the respective springs as follows:

There is a bumper 24 disposed across the front of the device ahead of the supporting member or seat as shown in Figures 1, 3 and 4. This bumper is mounted upon rods 25, 26 which are slidable longitudinally in the several bearing members 27 formed or attached to the seat structure.

The two outside rods 25 have coiled springs 28 surrounding them which are compressed between the bearings 27 and the bumper bar which serve to hold the latter in its forward or advanced position, as shown in Figure 3, but which permits the bumper bar to be moved backwardly a limited extent in relation to the bearings 27. These rods carry the devices for releasing the arcuate rod shown in Figure 5. On the end of each of these rods 25 there is a frustro conical releasing member 29 which is adapted to cooperate with an arm 30 of a trigger 31 which is pivotally mounted at 32 on a bracket 33 of the spring housings 16.

It will be understood that the construction is duplicated for each of the spring housings so that the description is applicable to both sides of the structure. The trigger 31 is pressed in one direction by the flat spring 34 secured at 35 to the spring housings; and the trigger has a tooth adapted to engage in the notch 36 on one end of the arcuate rod 18. The end of the arcuate rod adjacent this notch is chamfered as shown at 37 in order to lift the trigger when the arcuate rods are being being set into operative position.

The retractible carriage which carries the seat or body support is adapted to be rapidly retracted when released, by the following means. There are cables 38 secured as to hooks 39 arranged on the carriage; and these cables extend rearwardly or towards the chassis and are connected with relatively long, coiled springs 40 the opposite ends of which are connected with the cross member 2 of the chassis structure. It will be apparent that when these springs are permitted to do so, they cause the carriage to be retracted or moved backwardly, the H rails 6 travelling between the several supporting and guiding rollers 7, 8 until the carriage stops against the forward ends of the chassis beams 1 which is the rearmost position of the carriage.

The means for releasing the carriage for rearward reciprocation when a body strikes the bumper bar is as follows: The lower edges of the side webs of the H beams are shown provided with notches 41 at different distances along these H beams, the notches being disposed in both H beams in the same relative positions. There is a bracket 42 attached to the chassis frame at each side and there are pivotally mounted on these brackets the levers 43 extending crosswise of the device, the levers being pivoted at the points 44 to swing in horizontal planes. To one arm 45 of each lever there is connected a cable 46 which extends rearwardly and the opposite ends of these cables are connected with coiled springs 47 the opposite ends of which are connected with the cross member 2 of the chassis frame. These springs have a constant tendency to rock the levers 43 so that their arms 45 move rearwardly except when held in the position shown in Figure 1 by the releasing devices.

The rods 26 which are connected with the bumper extend rearwardly and are adapted to slide in the bearings 48 formed as part of the brackets 42. On these rods there are frustro-conical members 49 which act on the rings 50 on the lower ends of the plungers 51 as shown more clearly in Figures 10 and 11. When the bumper is in the forward position the rods 26 are in such position that their frustro conical members 49 engage the bottoms of the rings 50 and at this time the top of the ring seats against the bracket 42.

There is a coiled spring 52 disposed around each plunger 51 which plungers are fixed to or integral with the rings 50, the plungers being mounted to reciprocate in the arms 53 of the bracket 42.

These coiled springs at one end engage the collar 54 fixed on the plunger and the other end engages one of the arms 53 to normally lift the plunger and hold it in the position shown in Figure 10. When in this position each plunger extends upwardly above the uppermost arm 53 and into the path of the lever arm 45 so that both levers are retained in the position shown in Figures 1 and 2.

When the bumper is forced back by contact with any object, the frustro conical members 49 move into the rings 50 and their slanting surfaces cause the rings to be forced downwardly carrying the plungers with them until the upper ends of the latter are released from the path of the levers 43. This construction is the same at both sides of the vehicle. I have shown rods 55 connected or integral with the rods 26 forming continuations thereof, and these extend backwardly and may be connected with the ordinary brake treadle (not shown) within the vehicle so that the releasing device as represented by the plungers 51 may be manually operated by the driver of the vehicle independently of the automatic operation thereof.

I have shown a brake device which is located at opposite sides of the vehicle. It consists of levers 56 pivotally mounted at 57 on the brackets 58 secured to the front axle of the vehicle, the pivotal point 57 being separated from the axis of the wheels. The arms 59 of these levers extend outwardly and are curved and project across the treads of the wheels. There are shoes 60 preferably provided with a roughened or corrugated tread surface 61 which shoes are adapted to be moved into position between the treads of the tires and the ground, as shown in dotted lines in Figure 2 when the arms 56 are swung downwardly.

There are coiled springs 62 having one end connected with the arm 56 and the other end connected with the bracket 58 so that the tendency of these springs is to move the arms 56 downwardly into position for the shoe 60 to engage the road. Each of the levers 43 has an arm 64 extending on the opposite sides of their pivots to the arms 45 and these are adapted to lie in the path of and form stops for the upwardly extending arms 63 which project from the lever arms 56, so that when the levers 43 are in the crosswise position shown in Figure 1, the arms 63 are held in the raised position shown in full lines in Figures 1 and 2, at which time the shoes 60 are raised above and out of contact with the ground.

Attached to the brackets 42 on the chassis frame are bell crank levers 65 pivoted at the points 66. One arm 67 of each lever is provided with a curved portion having a tooth 68 acting as a pawl and engaging any one of the several notches 41 on the under side of the H beams, the construction being the same at both sides of the vehicle. The upwardly extending arm 65 of each of these levers is adapted to engage one of the lever arms 64 so that the latter acts as a stop when the parts are in the position shown in Figures 1, 2 and 10 and holds the bell crank levers so that their pawls engage in the notches 41 of the H beams. It will be apparent that when the levers 43 swing, the bell crank levers will be rocked in the direction necessary to release their pawls from the notches of the H beam, allowing the latter to be reciprocated by the springs 40.

At the sides of the seat frame I have shown housings 69 having brackets 70 which are provided with H shaped apertures 71 to receive the ends of the H beams to which they are rigidly secured.

The vertical, cylindrical portions of the housings enclose each a sliding plunger 72 which is surrounded by a coiled spring 73 which is compressed between a collar 74 which is fixed on the plunger and a plug 75 in the upper end of the housing. Each plunger is adapted to reciprocate vertically in the plug 76 at the lower end of the housing and outside the housing each plunger has mounted thereon a fork 77 carrying an axle 78 on which is mounted a freely revolvable wheel 79. Each housing is provided with a longitudinal slot 80 in which a pin 81, extending through the plunger, may move.

These pins are engaged for the purpose of holding the plungers in their upper or retracted position by means of a locking plate 82 which is formed as an extension of the frustro conical members 29 on the bumper rods 25. When the rods 25 are in their forward position, as shown in Figures 1, 2, 3 and 8, the plates 82 engage under the pins 81 and serve to hold the plungers in their upper or retracted position. When the rods 25 move backwardly with the bumper the notches 83 in the plates 82 move into register with the pins 81 and this permits the plungers to be moved downwardly by the springs 73 until the wheels 79 rest on the road surface and thus form an auxiliary support for the body supporting member or carriage.

Operation

The device is shown in Figures 1, 2, 5, 6, 8 and 10 in operative condition; that is to say, the parts are all arranged ready to be operated in the event the bumper strikes a pedestrian or even if it strikes a vehicle ahead of the one on which the apparatus is mounted. In this condition of the parts, the brake shoes 60 are supported in an elevated position as shown in Figure 2, so that they are free of the road surface and do not affect the movement of the vehicle.

The plungers 72 are at this time held in their elevated position by the plates 82 engaging under the pins 81 so that the plungers are raised as shown in Figure 8 and their wheels are free of the ground. The carriage or body supporting device is moved forwardly with the H beams and the pawls 68 engage in one set of notches 41 in the H beams, according to the position of the carriage. If the latter is in its extreme forward position the pawls 68 will engage in the rearmost set of notches in the H beams.

It is understood, however, that these pawls may engage in other sets of notches 41 if the carriage is to be set at some lesser distance from the chassis. At this time also, the arcuate rods 18 are retracted within their housings 16 and are held there by means of the triggers 31 engaging in the notches 36. The springs 40 are under considerable tension, tending to draw the carriage backwardly, but the carriage remains stationary as long as the pawls 68 are engaged in either set of notches in the H beams.

Assuming that the bumper comes in contact with a pedestrian, it will be forced backwardly by this operation against the opposition of the springs 28 and the four rods 25, 26 connected with the bumper will move backwardly. This will initiate several functions as follows: The plates 82 moving backwardly with the rods 25 will bring the notches 83 in register with the pins 81 and as soon as this occurs both plungers 72 will be forced downwardly by the springs 73 until the wheels 79 rest upon the road surface, the springs continuing to press downwardly on the plungers and thus causing an upward pressure on the housings 69 which are attached to the carriage. From then on, the plungers and their wheels assist in supporting the added weight of the body which it may be assumed has fallen upon the seat 13 and may rest against the back rest 14, the body falling over the retracted bumper.

At the same time that the backward movement of the bumper took place, the frustro conical members 29, moving rearwardly acted on the arms 30 to lift the triggers 31 in opposition to their springs 34 and this disengaged the triggers from the notches 36 in the bars 18. Immediately the bars 18 are projected from their housings by their coiled springs 22 so that these bars move in arcs of circles and come together at the front of this seat, as shown in Figure 4, thereby encircling the body which has fallen upon the seat and preventing it from falling forwardly out of the seat.

At the same time that the bumper made the backward movement above described, the frustro conical members 49 on the rods 26 operated on the rings 50 to move the latter downwardly, thereby retracting the plungers 51 from the path of the lever arms 45. As soon as this occurred, the lever arms 45 were moved backwardly by their springs 47 these levers being no longer restrained by the plungers 51. As these lever arms move backwardly as viewed in Figure 1, the arms 64, forming parts of the same levers, moved forwardly and in doing so released the arms 63 of the brake device.

As soon as this occurred, the brake levers 56 were swung down by the action of the springs 62 so that the shoes 60 were thrown in between the road surface and the tire of each front wheel as shown in dotted lines in Figure 2; and the roughened surfaces of the shoes grip the road in a positive manner and stop the vehicle rapidly. It will be noted that the brake levers 56 are mounted eccentrically of the axes of the front wheels and therefore the shoes 60 cannot go to the rear of the position shown in dotted lines in Figure 2.

When the lever arm 64 swings forwardly as above described, it presses against the upper end of the arm 65, thereby rocking the bell crank lever and disengaging its pawl 68 from the notch 41 in the H beam. There is then nothing to prevent the carriage with its H beams from moving longitudinally and the same is therefore rapidly moved backwardly or in the opposite direction to the motion of the vehicle, by the action of the springs 40 which pull rearwardly on the carriage and cause it to move backwardly until it stops against the forward ends of the chassis beams 1.

While this action is taking place, the carriage is retracting before the vehicle has been brought to a stop or almost instantly after contact of the body with the bumper, so that the impact of the body and the carriage is reduced to prevent the body from being injured. Naturally, the further out the carriage is placed when the device is set for operation, the greater will its retracting movement be. If the vehicle is one which travels at a fast rate, the carriage should be set forwardly at the most advanced position, whereas as if it is a slow moving vehicle, such as a truck, it may be at some intermediate position, the adjustment being determined by the particular notches 41 with which the pawls 68 engage.

When the levers 43 are released and are swung by their springs 47, the arms 64 of these levers pull on the cables 90. These cables are connected with the emergency brake (not shown) in the vehicle and cause this brake to be set about the time that the brake shoes 60 go into operation.

From the above it will be apparent that I have provided a retractible device or carriage adapted to receive and hold a pedestrian with which the device comes in contact, and to support the body off the ground. The carriage is made retractible, so that it is drawn back in the opposite direction to the movement of the vehicle for the purpose of offsetting the forward movement of the latter to such an extent as to permit the person to be received or picked up by the carriage with less shock to the person than if the carriage were to remain in fixed position in relation to the vehicle.

Furthermore, I provide means serving as an auxiliary support for the forward end of the carriage by the time the weight of the body rests on it. Also, I have provided an auxiliary brake which is automatically placed into operative condition when the bumper is retracted, so that the vehicle is brought to a stop quickly even though the driver of the vehicle should fail to set the regular brakes promptly. All of these devices are automatically initiated if the bumper comes into contact with a pedestrian and their operations are simple and rapid. In addition, the rods 18 are automatically projected in arcuate movements so that they come together, as shown in Figure 4, near the forward portion of the carriage, and prevent the body from being dislodged from the seat. This is also automatically actuated by the rearward movement of the bumper. The device as a whole is light in weight and does not interfere in any way with the ordinary operation of the vehicle.

To reset the device after it has been operated it is necessary to perform the following operations:

The carriage with the H beams is moved forwardly and the pawls 68 are engaged with one set of notches 41 in the H beams, whereupon the carriage is locked in its forward or projected position. The plungers 72 are lifted to disengage the wheels 79 from the ground and the pins 81 are held up by the plates 82. The rods 18 are pushed back into their housings and during this movement the chamfered ends 37 escape past the triggers 31 and the latter drop into the notches 36 under the action of their springs 34.

The levers 43 are moved to the positions shown in Figure 1 against the opposition of the springs 47 and the plungers 51 move upwardly into the position shown in Figure 10 to intercept the arms 45 of these levers and hold them in operative position until such time as the bumper is again actuated. The brake levers 56 are also raised into the full line position in Figure 2 by the lever arms 64 so that the brake shoes are held in raised position.

Various changes and modifications may be made in the construction of the apparatus without departing from the scope of the following claims.

Having described my invention, what I claim is:

1. Safety apparatus for vehicles, comprising a carriage for holding a pedestrian, means for supporting said carriage on a vehicle and adapted to permit the carriage to reciprocate in relation to the vehicle, and means operated by contact with a pedestrian for releasing said carriage to permit it to be moved backwardly in relation to the vehicle.

2. Safety apparatus for vehicles, comprising a carriage for holding a pedestrian, means for supporting said carriage on a vehicle and adapted to permit the carriage to reciprocate in relation to the vehicle, means for retracting the carriage in relation to the vehicle, and means operated by contact with a pedestrian for initiating the operation of said carriage by said operating means, whereby the carriage will be moved backwardly in relation to the vehicle.

3. Safety apparatus for vehicles, comprising a carriage for holding a pedestrian, means for supporting said carriage on a vehicle, in a position elevated above the ground, said means being adapted to permit the carriage to reciprocate in relation to the vehicle and means operated by contact with a pedestrian for releasing said carriage to permit it to be moved backwardly in relation to the vehicle.

4. Safety apparatus for vehicles, comprising a carriage for holding a pedestrian, means for supporting said carriage on a vehicle in a position elevated from the ground, said means being adapted to permit the carriage to reciprocate in relation to the vehicle, means for moving the carriage backwardly in relation to the vehicle, and means operated by contact with a pedestrian for initiating the reciprocation of the carriage by its said operating means.

5. Safety apparatus for vehicles, comprising a carriage for holding a pedestrian, means for supporting said carriage on a vehicle and adapted to permit the carriage to reciprocate in relation to the vehicle, spring means for retracting the carriage in relation to the vehicle, and means for initiating the reciprocation of the carriage by said spring means.

6. Safety apparatus for vehicles, comprising a carriage for holding a pedestrian, means for supporting said carriage on a vehicle with the carriage projected in advance of the vehicle and adapted to permit the carriage to reciprocate in relation to the vehicle, and means operated by contact with a pedestrian for releasing the carriage and permitting it to be moved backwardly in relation to the vehicle.

7. Safety apparatus for vehicles, comprising a carriage for holding a pedestrian, beams extending longitudinally of the vehicle and projecting forwardly thereof, said carriage being mounted on the forward ends of said beams, means for supporting said beams from the chassis of the vehicle and adapted to permit said beams and carriage to move longitudinally of the vehicle, and means operated by contact with a pedestrian for releasing said carriage to permit it to be moved backwardly in relation to the vehicle.

8. Safety apparatus for vehicles, comprising a carriage for holding a pedestrian, beams extending longitudinally of the vehicle and projecting forwardly thereof, said carriage being mounted on the forward ends of said beams, means for supporting said beams from the chassis of a vehicle and adapted to permit said beams and carriage to move longitudinally of the vehicle, spring means for retracting said carriage and beams, and means operated by contact with a pedestrian for releasing said carriage to permit it to be moved backwardly in relation to the vehicle.

9. Safety apparatus for vehicles, comprising a carriage for holding a pedestrian, longitudinally extending beams on the forward ends of which said carriage is mounted, means for connecting said beams with the chassis of a vehicle and including rollers engaging said beams, means for retracting said carriage, and means operated by contact with a pedestrian for releasing the carriage to permit it to be moved backwardly in relation to the vehicle.

10. Safety apparatus for vehicles, comprising a carriage for holding a pedestrian, H beams on the forward ends of which said carriage is mounted, means for supporting said H beams and carriage on the chassis of a vehicle and adapted to permit said carriage and beams to reciprocate longitudinally of the vehicle, and means for retracting said carriage and beams in relation to the vehicle.

11. Safety apparatus for vehicles, comprising a carriage for holding a pedestrian, H beams on the forward ends of which said carriage is mounted, means for supporting said H beams on the chassis of a vehicle and including rollers engaging above and below the middle web of said H beams whereby said H beams may travel longitudinally of the vehicle on roller supports, means for retracting said carriage, and means operated by contact with a pedestrian for initiating the operation of said carriage by its operating means.

12. Safety apparatus for vehicles, comprising a carriage for holding a pedestrian, means for supporting said carriage on a vehicle with the carriage in an advanced position in relation to the vehicle and adapted to permit the carriage to reciprocate in relation to the vehicle, means associated with said carriage adapted to be projected downwardly and having wheels for engaging the ground to provide an auxiliary support for said carriage, means for retracting said carriage, and means operated by contact with a pedestrian for initiating the retraction of said carriage and the downward projection of said auxiliary supports.

13. Safety apparatus for vehicles, comprising a carriage for holding a pedestrian, beams on which said carriage is mounted, means for mounting said beams on a vehicle chassis to permit the carriage to reciprocate in relation to the vehicle lengthwise thereof, means associated with said carriage and including spring plungers adapted to be projected downwardly, wheels mounted on the lower ends of said plungers for contact with the road surface, and means operated by contact with a pedestrian for initiating the backward movement of the carriage and the downward projection of said plungers.

14. Safety apparatus for vehicles, comprising a carriage for holding a pedestrian, means for supporting said carriage on a vehicle and adapted to permit the carriage to reciprocate in relation to the vehicle, housings associated with said carriage, spring plungers mounted in said housings, wheels carried by said plungers below the housings and adapted to be projected into contact with the road surface, and means operated by contact with a pedestrian for initiating the reciprocation of said carriage and downward projection of said plungers.

15. Safety apparatus for vehicles, comprising a carriage for holding a pedestrian, means for supporting said carriage on a vehicle and adapted to permit the carriage to reciprocate in relation to the vehicle, housings associated with said carriage, spring plungers arranged in said housings, said housings having vertical slots, pins on said plungers extending through said slots, means engaging said pins to hold said plungers in their raised positions, means operated by contact with a pedestrian for initiating the backward movement of said carriage and for releasing said pins to permit said plungers to move downwardly, and wheels mounted on the lower ends of said plungers and adapted to be brought into contact with the road surface to form an auxiliary support for said carriage.

16. Safety apparatus for vehicles, including a carriage for holding a pedestrian, means for supporting said carriage on the vehicle and adapted to permit the carriage to reciprocate in relation to the vehicle, brakes for the vehicle, and means operated by contact with a pedestrian for releasing the carriage to permit it to be moved backwardly in relation to the vehicle and to initiate the operation of said brakes.

17. Safety apparatus for motor vehicles, comprising a carriage for holding a pedestrian, means for supporting said carriage on a vehicle and adapted to permit the carriage to reciprocate in relation to the vehicle, means for reciprocating said carriage, a brake including shoes adapted to be projected between the wheels of the vehicle and the road surface, and means operated by contact with a pedestrian for initiating the reciprocation of said carriage and the operation of said brake.

18. Safety apparatus for vehicles, comprising a carriage for holding a pedestrian, means for supporting said carriage on a vehicle and adapted to permit the carriage to reciprocate in relation to the vehicle, said carriage having a seat for holding a pedestrian, members adapted to be projected forwardly of the seat to hold a pedestrian upon said seat, and means operated by contact with a pedestrian for initiating the reciprocation of said carriage and the operation of said holding means.

19. Safety apparatus for vehicles, comprising a carriage for holding a pedestrian, means for supporting said carriage on a vehicle and adapted to permit the carriage to reciprocate in relation to the vehicle, said carriage having a seat for a pedestrian, arcuate rods adapted to be projected forwardly of the seat to hold a pedestrian on the seat, and means operated by contact with a pedestrian for initiating the reciprocation of said carriage and the projection of said arcuate rods.

20. Safety apparatus for vehicles, including a carriage and means for attaching the same in advance of a vehicle, said carriage having a seat to hold a pedestrian, arcuate housings, arcuate rods disposed in said housings, springs in said housings for projecting said rods in arcuate paths, means for locking said rods in retracted positions in said housings, and means operated by contact with a pedestrian for releasing said rod holding means to permit the rods to be projected by their springs so that said rods are projected forwardly of said seat.

21. Safety apparatus for vehicles, including a carriage for holding a pedestrian, means for supporting said carriage on a vehicle and adapted to permit the carriage to reciprocate in relation to the vehicle, a brake device for the vehicle, means associated with said carriage and adapted to project it around a body resting on said carriage to retain the same thereon, and means operated by contact with a pedestrian for initiating the operation of said holding means, the reciprocation of said carriage and the operation of said brake device.

22. Safety apparatus for vehicles, comprising a carriage for holding a pedestrian, means for supporting said carriage on a vehicle and adapted to permit the carriage to reciprocate in relation to the vehicle, operating means for retracting said carriage, a yieldable bumper on the forward portion of said carriage, and means operated by contact of a pedestrian with said bumper, for initiating the retraction of said carriage.

23. Safety apparatus for vehicles, comprising a carriage for holding a pedestrian, means for supporting said carriage on a vehicle and adapted to permit the carriage to reciprocate in relation to the vehicle, a yieldable bumper on the forward portion of said carriage, arcuate arms having means for projecting them to surround a body on said carriage, triggers for holding said arms in retracted position, and means operated by said bumper for releasing said trigger to cause the projection of said arms.

24. Safety apparatus for vehicles, comprising a carriage for holding a pedestrian, beams on the forward ends of which said carriage is mounted, means for supporting said beams on the chassis of a vehicle and adapted to permit said beams to reciprocate lengthwise of the vehicle, said beams having notches at various positions along the length of the same, triggers for engaging in said notches to hold said carriage projected forward of the vehicle different distances, spring means for retracting said carriage and means operated by contact with a pedestrian for initiating the retraction of said carriage.

25. Safety apparatus for vehicles, comprising a carriage for holding a pedestrian, means for supporting said carriage on a vehicle and adapted to permit the carriage to reciprocate in relation to the vehicle, springs connected with said carriage and with a member of the vehicle for retracting the carriage, brake devices, a lever for normally holding said brake devices out of operation, means for locking said carriage in its forward position, levers for holding said brake devices and said carriage locking device, springs tending to move said levers to permit the operation of the brake devices and the release of said carriage locking means, a bumper adjacent the forward end of said carriage and means operated thereby for releasing said levers.

26. Safety apparatus for vehicles, comprising a carriage for holding a pedestrian, beams on the forward end of which said carriage is mounted, means for supporting said beams on the chassis of a vehicle and adapted to permit said beams and said carriage to reciprocate lengthwise of the vehicle, brackets mounted on said beams, levers pivoted on said brackets, springs for operating said levers in one direction, means for holding said levers, a bumper adjacent the forward end of the carriage, means operated thereby for releasing said lever holding means, means for locking said carriage and beams in a position in advance of the vehicle, said locking means being adapted to be operated by said levers.

GEORGE ROTTMAN.